Oct. 3, 1961 R. W. LEE 3,002,760
TRAILER LIFT
Filed June 1, 1959 2 Sheets-Sheet 1

INVENTOR.
Russell W. Lee
BY Victor J. Evans & Co.
ATTORNEYS

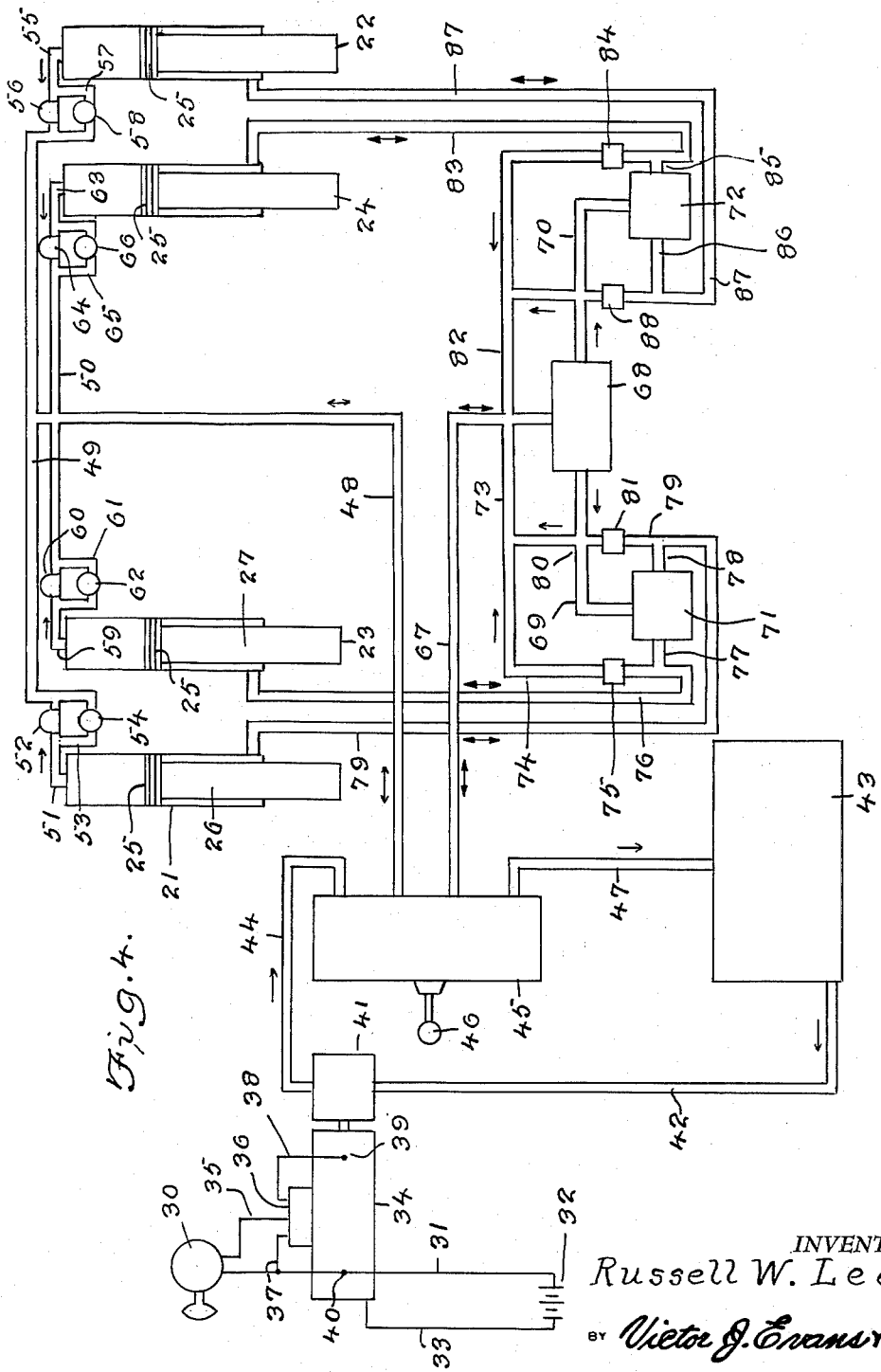

United States Patent Office 3,002,760
Patented Oct. 3, 1961

3,002,760
TRAILER LIFT
Russell W. Lee, La Mirada, Calif.
(Rte. 1, Bald Knob, Ark.)
Filed June 1, 1959, Ser. No. 817,145
1 Claim. (Cl. 280—43.23)

This invention relates to auxiliary trailer bodies designed to be super-imposed on a conventional truck body, such as a pick-up truck and in which the auxiliary trailer body is provided with hydraulic jacks at the corners by which the body may be elevated above the body of a truck, retained in an elevated position, and lowered to a carrying position on the same truck body or on the body of another truck.

The purpose of this invention is to provide elevating and supporting means in an auxiliary truck body whereby the auxiliary truck body may be carried from one location or station to another, deposited in a convenient position for loading and unloading and picked up by the same or by another truck after loading or unloading; thereby obviating the necessity of tying up the truck while loading or unloading the auxiliary truck body.

Large trailers have been separably connected to tractors and the like and small supporting wheels have been provided in such trailers to relieve the tractors so that the tractors may be used for towing other trailers while the trailers are being loaded and unloaded. However small trucks of the pick-up type, which also require considerable time for loading and unloading, are inactive while being loaded or unloaded and, consequently, considerable valuable time is lost while such trucks are being loaded and unloaded. With this thought in mind this invention contemplates an auxiliary cargo carrying body designed to be super-imposed upon a body of a small truck, and hydraulic jacks positioned in corners of the super-imposed auxiliary body for elevating the body above the body of a carrying truck and also for supporting the body while material is being removed therefrom or loaded therein.

The object of this invention is, therefore, to provide a super-imposed truck body having hydraulic jacks in the corners whereby, by lowering the jacks, the body may be elevated to facilitate driving a carrying truck body to a suitable position below.

Another object of the invention is to provide an auxiliary truck body having hydraulic jacks in the corners in which the hydraulic jacks are actuated by control means or adjacent to the cab of a truck, upon which the auxiliary body may be positioned.

Another important object of the invention is to provide an auxiliary cargo carrying truck body having hydraulic jacks in the corners for elevating and lowering the body in which the body may be deposited upon a truck without modifying parts of the truck.

A further object of the invention is to provide an auxiliary truck body designed to be super-imposed upon the body of a conventional truck in which the auxiliary truck body is supported by hydraulic jacks and in which the auxiliary truck body is of a simple and economical construction.

With these and other objects and advantages in view the invention embodies a truck body having hydraulic jacks in the corners and means for actuating the jacks in which the hydraulic jacks are positioned to straddle the body of a carrying truck.

Other features and advantages of the invention will appear from the following description taken in connection with the drawing, wherein:

FIGURE 4 is a diagrammatic view showing connections of the hydraulic jacks of the auxiliary truck body to fluid pressure and control elements.

Referring now to the drawings wherein like reference characters denote corresponding parts the auxiliary truck body is designed to rest upon upper edges of side walls of a truck with an extended portion at the forward and projected over and resting upon the upper surface of a cab of a truck.

Figure 1:
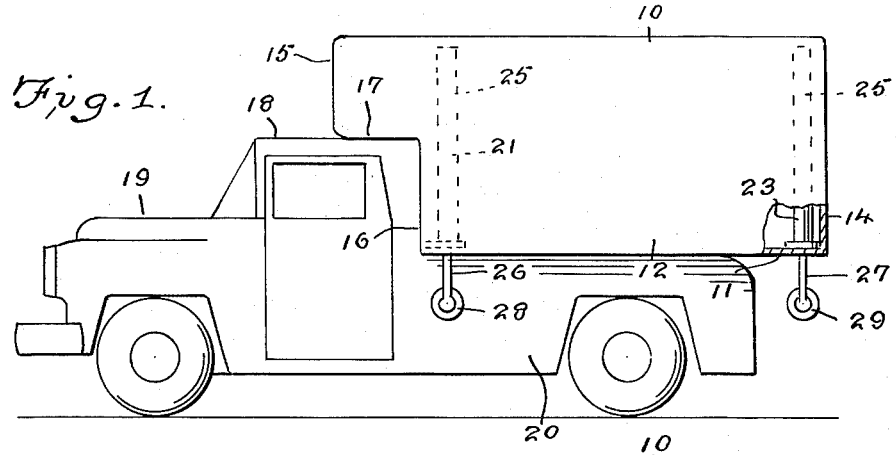
FIGURE 1 is a side elevational view of a truck having an auxiliary body super-imposed on the rear portion thereof, showing the auxiliary body in position for traveling.
Figure 2:
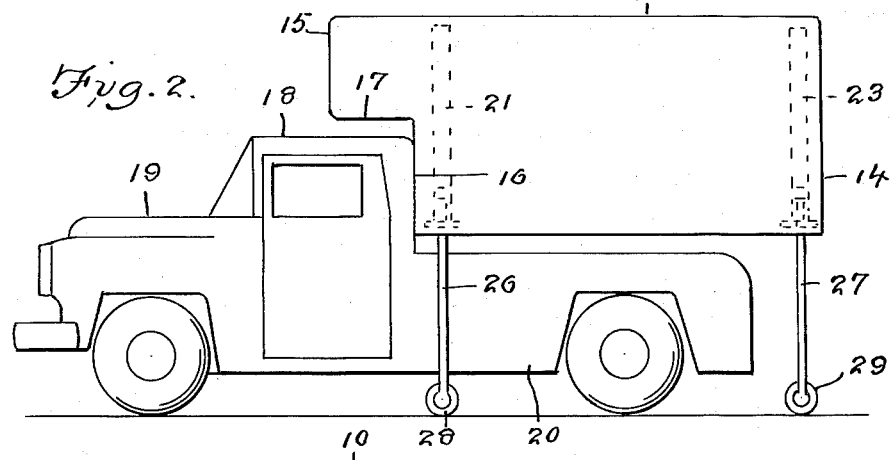
FIGURE 2 is a side elevational view, similar to that shown in FIGURE 1, showing the auxiliary body elevated above the truck by hydraulic jacks, piston rods of which extend downwardly to the ground or to a floor.
Figure 3:
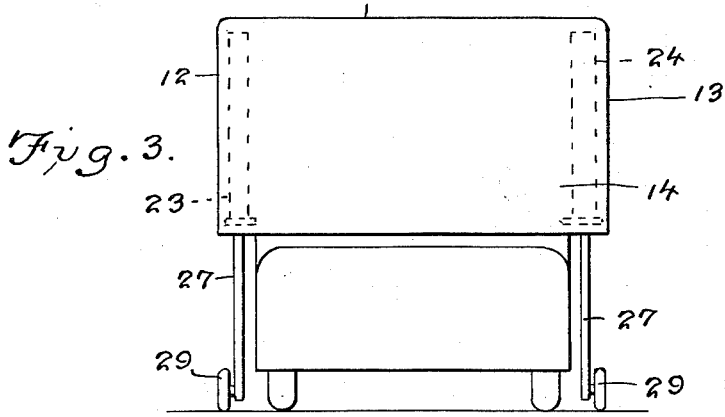
FIGURE 3 is an end elevational view of the auxiliary body and truck assembly, with the parts as shown in FIGURE 2, wherein the auxiliary body is elevated above the body of the truck.

The auxiliary truck body 10 includes a base 11 having side walls 12 and 13 and a rear end wall 14 extended upwardly therefrom, a front wall having an upper section 15 and a lower section 16 extended upwardly from the forward end, and a horizontally disposed panel 17 extended from the lower end of the section 15 of the front wall to the upper end of the section 16 of the front wall and designed to rest upon the upper surface 18 of a truck 19 having side walls 20.

The auxiliary body 10 is provided with hydraulic cylinders or jacks 21 and 22 at the forward end and 23 and 24 at the rear and the jacks are provided with pistons 25 from which piston rods 26 at the forward end and 27 at the rear extend. The lower ends of the piston rods are provided with rollers 28 at the forward end of the body and 29 at the rear.

The hydraulic cylinders are actuated by a starter switch 30 that may be positioned in a cab 18 and, as shown in FIGURE 4, the starter switch 30 is connected by a wire 31 to one terminal of a battery 32 for a motor vehicle. The opposite terminal of the battery 32 is connected by wire 33 to a starter 34 and a terminal of a solenoid 36 for the starter is connected by a wire 35 to the opposite terminal of the starter switch. The solenoid 36 is connected by a wire 37 to the wire 31 and is connected by a wire 38 to a terminal 39 of the starter. The wire 31 is also connected to a terminal 40 of the starter thereby completing a circuit to the solenoid and to the starter for actuating a pump 41 as the switch 30 is actuated. The suction side of the pump 41 is connected by a tube 42 to a reservoir 43 and the discharge side of the pump is connected by a tube 44 to a four-way valve 45 which is actuated by a handle 46 that may also be positioned in a cab of a truck. The four-way valve is connected by a tube 47 to the reservoir 43.

The four-way valve 45 is actuated by the handle 46 to supply fluid under pressure to upper ends of the cylinders of the hydraulic jacks through a pipe 48 for driving the pistons 25 downwardly with the rollers 28 and 29 contacting the ground, or floor, for forcing the auxiliary body 10 upwardly, whereby the auxiliary body is supported above a truck body. The pipe 48 may extend from the four-way valve to pipes 49 and 50 which are connected to upper ends of the cylinders, the pipe 49 being conencted to the cylinder 21 by a tube 51 having a check valve 52 therein and the pipe is provided with a by-pass 53 in which a speed valve 54 is positioned.

The opposite end of the pipe 49 is connected by tube 55 having a check valve 56 therein to the upper end of the cylinder 22 and the connection is provided with a by-pass 57 having a speed valve 58 therein.

A tube 50 which also extends from the upper end of the pipe 48 is connected to the upper end of the cylinder 23 by a tube 59 in which there is interpolated a check valve 60 and a by-pass 61 having a speed valve 62 therein is connected to the pipe 50 at opposite ends of the check valve 60. The opposite end of the pipe 50 is connected by a tube 63, having a check valve 64 in there to the upper end of the cylinder 24 and this connection is provided with a by-pass 65 having a speed valve 66 therein.

The four-way valve 45 is also provided with a pipe 67 that extends to an equalizer 68 and the equalizer 68 is provided with branch connections 69 and 70 which extend to equalizers 71 and 72. A pipe 73 also extends from the pipe 67 and the extended end of the pipe 73 is connected to a tube 74 in which a check valve 75 is positioned and from the check valve 75 the tube is connected to the lower end of the cylinder 23 by a tube 76. The tube 76 is connected to one side of the equalizer 71 by a tube 77. The opposite side of the equalizer 71 is connected by a tube 78 to a tube 79 extended from the pipe 73 and connected to the tube 69 at the point 80, and the tube 79, which is provided with a check valve 81, is extended to the lower end of the cylinder 21.

A pipe 82, which extends from the opposite side of the pipe 67 is connected to a tube 83 in which a check valve 84 is positioned and the tube 83 is connected to the equalizer 72 by a tube 85. The opposite side of the equalizer 72 is connected by a tube 86 to a tube 87 which extends from the pipe 82 and which is also connected to the tube 70 connecting the equalizer 72 to the equalizer 68. The tube 87 is also provided with a check valve 88.

With the parts assembled as illustrated and described a four-way valve, which may be positioned in the cab of the truck or in the forward end of the auxiliary body, is readily set to supply fluid under pressure discharged by the pump 41, into upper ends of the cylinders 21, 22, 23, and 24. When the switch 30 is actuated the starter 34 will operate the pump 41. Fluid will be drawn by the suction inlet of the pump 41 from the reservoir 43 through tube 42 and will be supplied to the fourway valve 45 through tube 44. The handle 46 of the valve 45 will be moved to form communication of the valve 45 with the pipe 67. Fluid from pipe 67 will enter equalizer 68 so that equal quantities of the fluid will leave the equalizer 68 through tubes 69 and 70 to enter equalizer 71 and 72. The equalizers 71 and 72 will again equalize the fluid and the fluid will pass through pipes 77 and 78 into pipes 76 and 79 to be supplied to the bottom of the cylinders or jacks 21 and 23, and through pipes 86 and 85 into the pipes 83 and 87 to be supplied through the bottom of the cylinders or jacks 22 and 24, thus the pistons 25 in all of the cylinders will be moved upwardly. Fluid will be forced out of the cylinders or jacks through the tubes 49 and 50 and return by pipe 48 to the fourway valve 45.

When the handle 46 is moved to form communication with the pipe 48 fluid will flow through pipe 48 and tubes 49 and 50 forcing the pistons 25 downwardly and elevating the auxiliary truck body so that said body is free of the body of a truck positioned below. Fluid will then leave the cylinders 21, 22, 23, and 24 through tubes 76, 79, 83 and 87 and pass through check valves 75, 81, 84, and 88 and return through tubes 73 and 82 to pipe 67 and then back into valve 45. Thus by actuating the handle 46 the four-way valve is set to supply fluid under pressure through the pipe 67 to lower ends of the cylinders whereby the pistons are driven upwardly retracting the piston rods and rollers 28 and 29 whereby the rods and rollers are drawn upwardly to the positions shown in FIGURE 1 in which positions the rollers remain in transportation. By this means the auxiliary truck body is readily elevated above the body of a carrying truck and supported on the piston rods and rollers so that the truck may be driven away, making it possible to load and unload the auxiliary body 10 while the truck is being used to transport another body or for other purposes.

It will be understood that modifications, within the scope of the appended claims, may be made in the design and arrangement of the parts without departing from the spirit of the invention.

What is claimed is:

In a fluid control system for use with an auxiliary truck body, the improvement comprising vertically disposed hydraulic cylinders mounted in corners of the body, pistons in the cylinders, piston rods extended from the pistons through lower ends of the cylinders, rollers in the lower ends of the piston rods, a starter motor, a pump connected to and driven by said starter motor, a reservoir connected to the suction inlet of said pump, a four way valve connected to the discharge outlet of said pump, and said reservoir, fluid conducting tubes connecting said four way valve to the upper and lower ends of the cylinders whereby fluid under pressure is supplied selectively to the upper and lower ends of the cylinders, a check valve in each of the fluid conducting tubes connected to the upper ends of said cylinders, a bypass having a speed valve therein connected to each of said last-mentioned fluid conducting tubes for bypassing said check valves, a first equalizing valve interpolated in the fluid conducting tubes connecting the four way valve to the lower ends of said cylinders, a pair of second equalizing valves connected to said first said equalizing valve and interpolated in the fluid conducting tubes connected to the lower ends of said cylinders, said second equalizing valves also connected to the fluid conducting tubes connecting said four way valve to said first said equalizing valve, check valves in the fluid conducting tubes connecting said second equalizing valves to the fluid conducting tubes connecting first said equalizing valve to said four way valve, said check valves and said equalizing valves equalizing the pressure of the fluid supplied to the cylinders by said pump for providing even upward and downward movement of the rods in said pistons, means for supplying electrical current to said starter motor and means for controlling the flow of the electrical current to said starter motor.

References Cited in the file of this patent

UNITED STATES PATENTS

| | | |
|---|---|---|
| 1,303,854 | Clark | May 20, 1919 |
| 1,425,965 | Hocke | Aug. 15, 1922 |
| 2,460,774 | Trautman | Feb. 1, 1949 |
| 2,646,070 | Holland | July 21, 1953 |
| 2,737,196 | Eames | Mar. 6, 1956 |
| 2,751,234 | Couse | June 19, 1956 |
| 2,809,051 | Jackson | Oct. 8, 1957 |
| 2,829,789 | Gerhardt | Apr. 8, 1958 |
| 2,845,251 | Barton | July 29, 1958 |
| 2,862,449 | Wyland | Dec. 2, 1958 |
| 2,906,096 | Richardson | Sept. 29, 1959 |

FOREIGN PATENTS

| | | |
|---|---|---|
| DAS 1,013,182 | Germany | Aug. 1, 1957 |
| 763,050 | Great Britain | Dec. 5, 1956 |
| 287,472 | Switzerland | Apr. 1, 1953 |